United States Patent [19]

Debruhl, Jr.

[11] Patent Number: 4,903,464

[45] Date of Patent: Feb. 27, 1990

[54] OVERHEAD PLANT CLIPPING SYSTEM

[76] Inventor: Ray Debruhl, Jr., 308 Forest Dr., La Grange, N.C. 28551

[21] Appl. No.: 323,491

[22] Filed: Mar. 14, 1989

[51] Int. Cl.$^4$ ............................................. A01D 34/63
[52] U.S. Cl. .......................................... 56/10.1; 47/17
[58] Field of Search ............... 56/DIG. 15, 10.2, 10.1, 56/10.5; 47/17

[56] References Cited

U.S. PATENT DOCUMENTS

| 4,355,497 | 10/1982 | Murphy | 56/10.2 X |
| 4,697,405 | 10/1987 | DeWitt et al. | 56/10.2 X |

OTHER PUBLICATIONS

*Flue Cured Tobacco Farmer*, Jun. 1988, vol. 25, No. 7, pp. 5-8, Sid Reynolds, Harris Barnes.

*Primary Examiner*—David A. Scherbel
*Assistant Examiner*—Jerrold D. Johnson
*Attorney, Agent, or Firm*—Rhodes, Coats & Bennett

[57] ABSTRACT

The present invention entails a plant clipping system for clipping the top portion of growing plants. A boom structure is supported over an area of underlying plants. A plant clipping device is movably mounted on the boom structure and depends downwardly therefrom. In operation, the plant clipping device is fixed in a certain position on the boom structure and the boom is moved over the underlying plants and during this process the plant clipping device clips the top portion of the plants. The plant clipping device can be laterally adjusted on the boom structure such that it can be moved from one location to another location on the boom structure. By repeatedly shifting the position of the plant clipping device on the boom structure after each boom traverse it is seen that a relatively large area of plants underlying the boom structure can be clipped.

37 Claims, 5 Drawing Sheets

OVERHEAD PLANT CLIPPING SYSTEM

FIELD OF THE INVENTION

The present invention relates to plant husbandry and more particularly to a method and automatic system for clipping plants, especially transplants, that may be housed in a growing area or greenhouse.

BACKGROUND OF THE INVENTION

In recent years it has become a popular cultural practice to clip plants and transplants during their early growing periods. Essentially, this entails periodic cuttings. Typically a small top portion of the plant is clipped. Generally the clipped portion would be approximately one-half of the leaf height above the buds. In a typical clipping operation this would entail cutting approximately one-inch of the top portion of the plant.

It has been found that periodic clipping, as described above, promotes plant uniformity which is so important in growing transplants such as tobacco and other vegetables. In addition, periodic clipping toughen the plant without inducing stress. That obviously makes the plants more valuable inasmuch as they are better able to withstand the stresses of transplanting.

There is one major drawback to the practice of plant clipping. That drawback is that the practice is very time consuming and requires much labor which translates into substantial expense. Typically today a plant clipping operation employs a stationary cutting device that is fed by a conveyor. Workers will remove plant trays from the greenhouse and transport them to the conveyor and stationary clipping apparatus. Each plant tray is placed on the conveyor and run through the stationary clipper and then returned to its original location in the greenhouse where it is once again placed on its support within the greenhouse. For a greenhouse that is approximately 35 feet by 300 feet, a clipping operation would take eight people eight hours. This same clipping operation is repeated weekly. Thus, it is easily seen why plant growers have been reluctant to adopt and use this valuable cultural practice. The expense and the difficulty of getting labor in the first place has seriously deterred plant growers from making use of the most valuable cultural practice.

Therefore, there has been and continues to be a need for an automated plant clipping system that will reduce the labor requirements and the overall expense of a plant clipping operation.

SUMMARY AND OBJECTS OF THE INVENTION

The present invention entails an automated plant clipping system for use in conjunction with a greenhouse or other plant growing area. The system of the present invention entails a boom structure that is mounted such that it can be moved back and forth over plants within the greenhouse or within the plant growing area. A plant clipping device is movably mounted on the boom type structure. The plant clipping device depends downwardly from the boom type structure and closely overlies the underlying plants. Forming a part of the plant clipping device is a clipping unit such as a lawn mower that includes a blade for engaging and clipping the top portions of the underlying plants.

In operation, the boom structure can be moved back and forth over the plants and in the process the plant clipping unit will cut the top portions of the underlying plants. It is appreciated that during each pass of the boom structure the plant clipping device will simply cut a swath having a width equal to the width of the cutting unit. To accommodate the need to clip the entire greenhouse area, the plant clipping unit is provided with means for laterally shifting the same from one location to another on the boom structure. Therefore, the present system is provided with means for enabling the plant clipping unit after each traverse of the boom structure to be shifted over such that succeeding adjacent swaths maybe be cut. Thus, it is appreciated that the entire greenhouse or plant area can be clipped in this process.

It is therefore an object of the present invention to provide an automatic plant clipping system for a greenhouse or plant growing area.

A further object of the present invention resides in the provision of an automatic overhead boom type plant clipping system for a greenhouse or plant growing area.

Another object of the present invention is to provide a method or process for clipping greenhouse plants without having to move or transport the plants to a separate cutting location.

Another object of the present invention resides in the provision of an automatic plant clipping system that is substantially fully automatic and which reduces labor requirements over conventional approaches.

Another object of the present invention resides in the provision of an automatic plant clipping system of the character referred to above that is relatively simple, easy to use, and which is reliable.

Still a further object of the present invention resides in the provision of an automatic plant clipping system of the character referred to above that is capable of reaching substantially all of the plants within a greenhouse irrespective of side posts and other obstructions.

Another object of the present invention resides in the provision of an automatic plant clipping device whose height can be closely and finely adjusted with respect to the underlying plants so as to cut a precise top quantity of the respective plants during the clipping operation.

Other objects and advantages of the present invention will become apparent and obvious from a study of the following description and the accompanying drawings which are merely illustrative of such invention.

DETAILED DESCRIPTION OF THE INVENTION

Figures 1, 2:
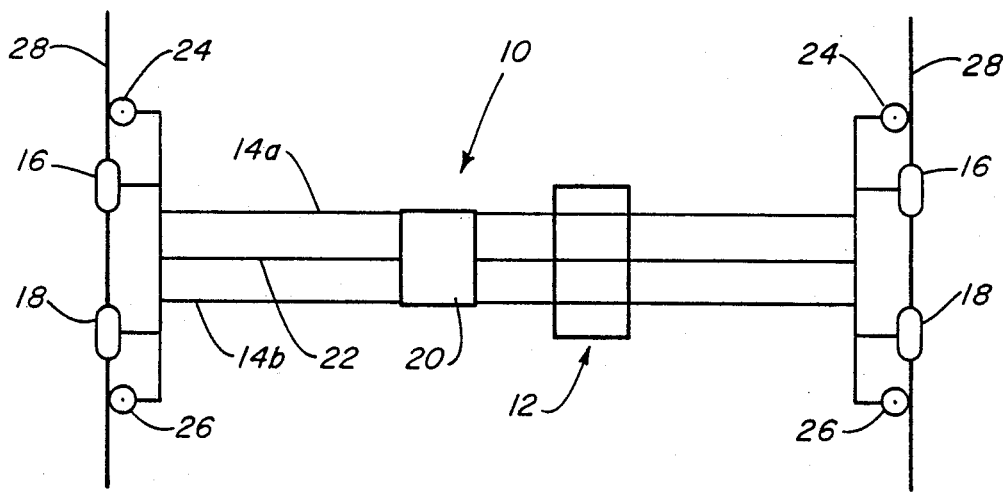
FIG. 1 is a schematic view of the plant clipping system of the present invention.
FIG. 2 is a perspective view of the plant clipping machine suspended from a transverse boom and illustrates the plant clipping process.
Figure 3:
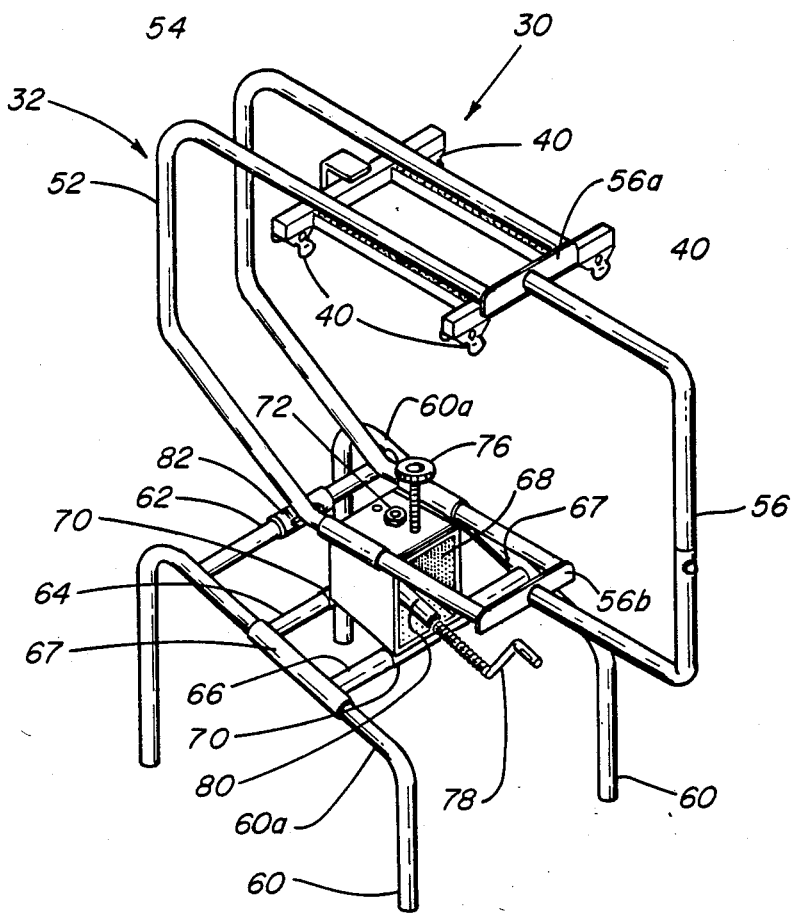
FIG. 3 is a perspective view of the carrier assembly of the plant clipping machine.

With further reference to the drawings, particularly FIGS. 1 and 2, the plant clipping system of the present invention is shown therein. The plant clipping system of the present invention includes a boom structure indicated generally by the numeral 10. As shown in the drawings, boom structure 10 is designed to traverse a greenhouse or other plant growing area. Note that boom structure 10 is specifically designed to move over underlying plants.

In FIG. 1, the plant clipping system of the present invention is shown in schematic form. Therein note that boom structure 10 comprises a transverse frame structure 14a and 14b that includes a pair of end driven wheels 16 and 18. Wheels 16 and 18 are driven from a power source, such as an electric motor or gasoline engine 20 and a drive shaft 22 that extends from the power source 20 and is operatively connected to the respective drive wheels 16 and 18 disposed about opposite ends of the boom structure 10.

Because the span of boom 10 could be relatively long, the same would be typically provided with a pair of guide rollers 24 and 26 about each end thereof. The guide rollers are designed to engage the inside of a pair of rails 28 that would be typically provided in the greenhouse or around the plant growing area. The purpose of the guide rollers 24 and 26 is to maintain alignment of the boom on the rails 28 as the same is powered along the rails. It should be pointed out that the guide rollers 24 and 26 can be spring biased against the inside of the rails 28 for efficient operation.

For a more complete and unified understanding of a traveling boom structure, one is referred to the boom type irrigation system that is manufactured and sold by Transplant Systems, 2319 Richland Road, Kinston, N.C. 28501. Transplant systems produces a wide span boom used for the purpose of irrigating plants within a greenhouse or a plant growing area.

Continuing to refer to the schematic of FIG. 1, a plant clipping device or machine is mounted to the boom structure 10 and indicated generally by the numeral 12. As will be understood from subsequent portions of this disclosure, the plant clipping device or machine 12 is movably mounted on the boom structure 10 such that it can be shifted in increments from one end to another end.

Viewing the plant clipping device or machine 12 it is seen that the same includes a carriage indicated generally by the numeral 30, a carrier frame indicated generally by the numeral 32 that is secured to the carriage 30 and depends therefrom, and a plant clipping unit indicated generally by the numeral 34 and suspended from the carrier 32.

Reviewing the clipping device or clipping machine 10 in more detail, it is seen that the carriage 30 is designed to rest atop the boom structure indicated generally by the numeral 10 and which comprises a pair of top rails 14a and 14b. Carriage 30 includes a pair of elongated rails 36 and 38, each rail including end rollers (not shown) with the rollers lying generally within the confines of a U-shaped guide bracket 40 formed on each end of the rails 36 and 38.

Figure 8:
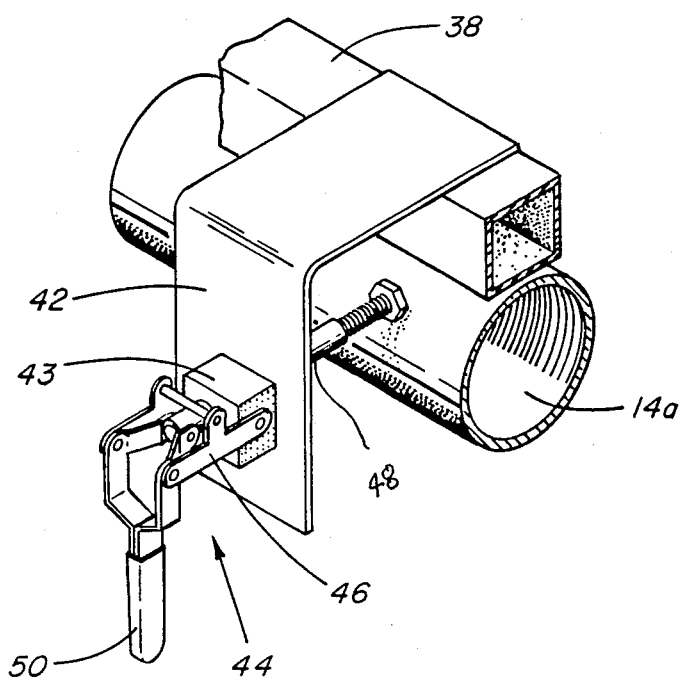
FIG. 8 is a fragmentary perspective view showing the locking mechanism associated with the carriage.

Carriage 30 is provided with a stop mechanism which is designed to station and hole the carriage 30 at a selected point along the boom structure 10. In FIG. 8, this stop mechanism is shown and comprises a generally L-shaped bracket 42 that is secured to guide rail 38. A latching mechanism indicated generally by the numeral 44 is mounted to bracket 42 and includes a latch support 46 and a stop rod 48. Stop rod 48 is reciprocately mounted and extends through bracket 42 and a guide block 43. Further, stop rod 48 is operatively connected about a remote end to a latch handle 50. It is appreciated that latch handle 50 is pivotally mounted to the latch support 46 and is operative to move the stop rod 48 between locked and unlocked positions. In a locked position the stop rod 48 extends inwardly and engages members 14a of the boom structure so as to hold and station the carriage 30 in one location on the same boom structure.

Figure 4:
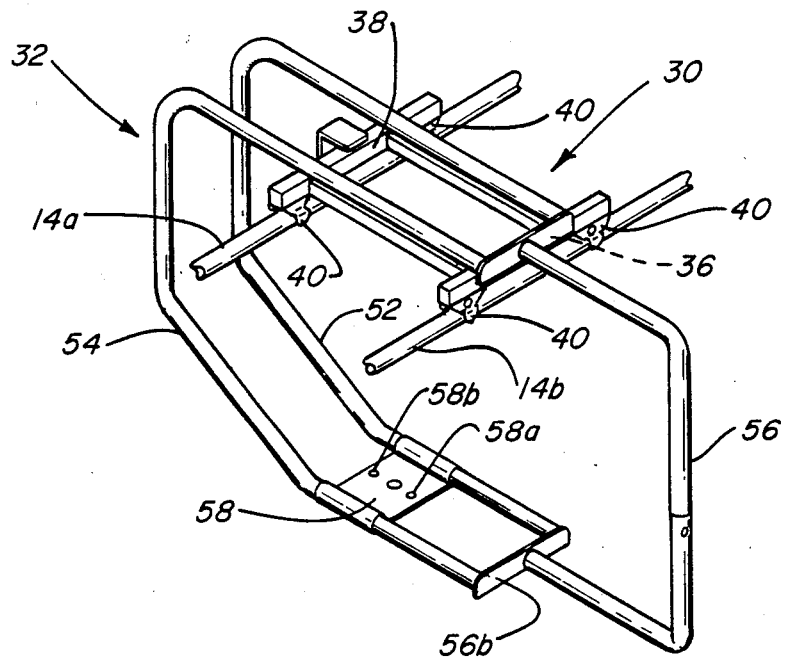
FIG. 4 is a perspective view of the upper portion of the carrier assembly.
Figure 5:
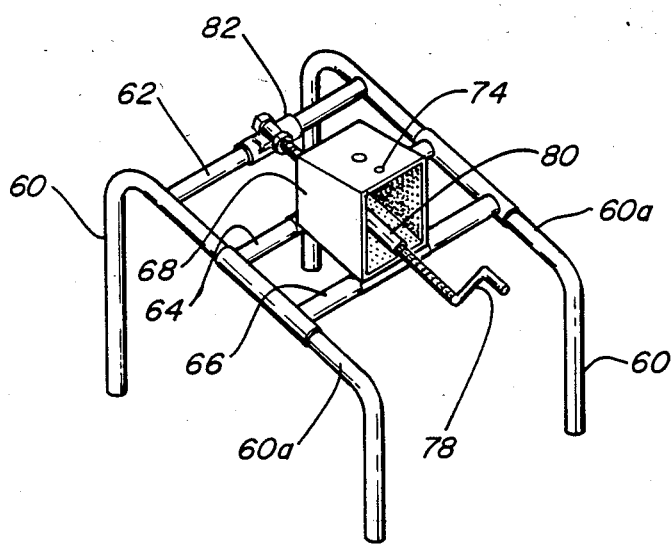
FIG. 5 is a perspective view of the lower portion of the carrier assembly.
Figure 6:
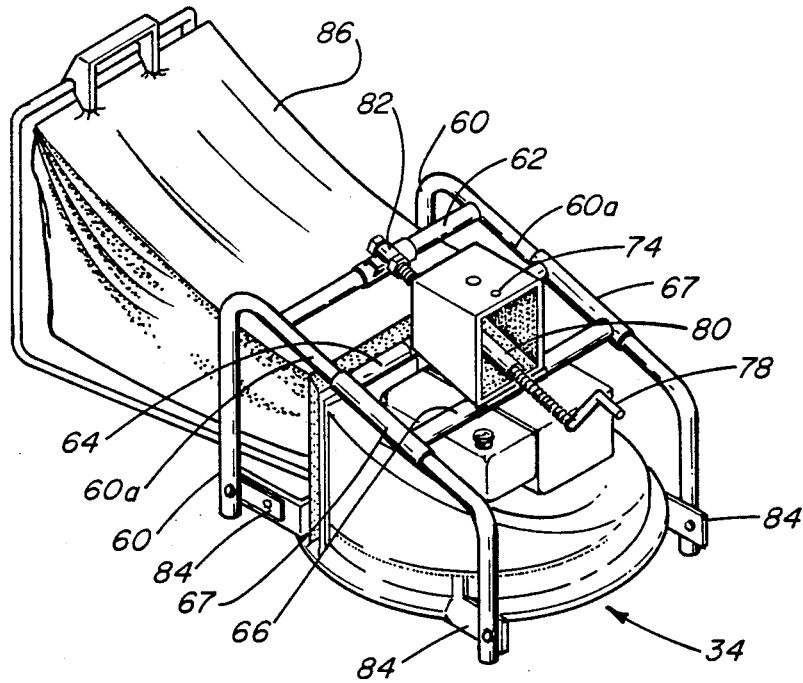
FIG. 6 is a perpsective view of the lower portion of the carrier assembly having the clipping unit secured thereto.
Figure 7:
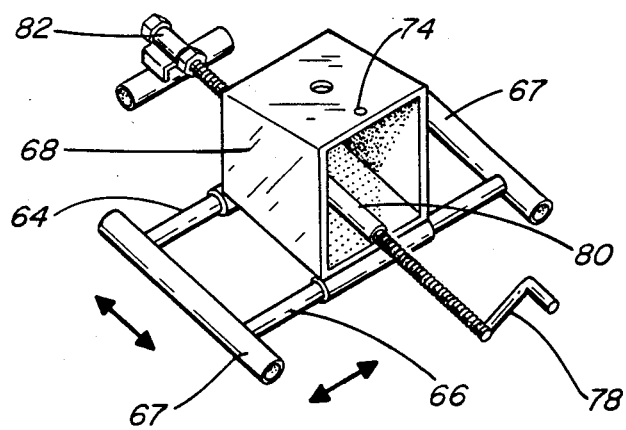
FIG. 7 is a perspective view of a portion of the lower frame assembly of the carrier, illustrating the directions of movement of this structure.

Depending from carriage 30 is a carrier assembly 32. The carrier assembly includes both an upper frame assembly (FIG. 4) and a lower frame assembly (FIG. 5). First, viewing the upper frame assembly, it is seen that the same includes a pair of generally parallel extending main support bars 52 and 54. It is seen that the support bars 52 and 54 actually interconnect rails 36 and 38 and extend outwardly from one side thereof where the support bars turn downwardly and extend therefrom to where they turn back generally underneath the boom structure 10 and carriage 30. A stabilizer bar assembly 56 is interconnected between the terminal end of the main support bars 52 and 54. Stabilizer bar assembly 56 includes a pair of T-ends 56a and 56b that include projecting tubular or other shaped members that project into respective open ends of main support bars 52 and 54. Thus, the stabilizing bar assembly 56 tends to stabilize the upper frame assembly of carrier 32.

Secured between the lower portion of main support bars 52 and 54 generally midway between the carriage rails 36 and 38, is a mounting and rotating plate indicated by the numeral 58.

Now viewing the lower frame assembly of the carrier 32, as seen in FIG. 5, it is seen that the lower frame assembly includes a pair of generally U-shaped side members 60. It is noted that the side members 60 are generally inclined upwardly towards the rear and consequently includes an inclined ramp portion 60a. Lower frame assembly includes a fixed rear cross member 62. There is provided another pair of cross members 64 and 66 that are secured between a pair of side slide sleeves 67. Side slide sleeves 67 are confined around the inclined ramp portion 60a of side members 60. Thus, it is appreciated that cross members 64 and 66 may be moved back and forth along the inclined ramp 60a.

In addition, the lower frame assembly includes an open front support box 68 that is secured to a pair of slide sleeves 70 that are slidably mounted on cross members 64 and 66. The significance of this design feature will be appreciated from subsequent portions of this disclosure.

The upper and lower frame assemblies of carrier 32 are interconnected by a pivot pin 72 that extends downwardly through mounting plate 58 and through an opening formed in the top of support box 68. In fact, the lower frame assembly may rotate with respect to the upper frame assembly through the pivot pin 72. In order to lock the lower frame assembly in a set position there is provided a locking pin 76 that is designed to extend through either opening 58a or 58b of the mounting plate 58 into a lock opening 74 formed in the top of support box 68.

A threaded crank 78 is threaded through a threaded sleeve 80 secured to the support box 68. The rear terminal end of threaded crank 78 is anchored into an anchoring collar 82 that permits the crank to be rotated but not to move axially therein.

Finally, the lower ends of the side members 60 are connected to a series of mounting brackets 84 that enable the clipping unit 34 to be secured to the lower frame assembly of the carrier 32. The structure of the clipping unit 34 is not dealt with herein in detail because such is structurally per se not material to the present invention and because the clipping unit comprises a conventional powered lawn mower. As such, the clipping unit includes a housing structure that encloses a rotary blade (not shown) and further includes a power source supported on the housing. In addition, the clipping unit includes a conventional clippings catcher that is referred to by the numeral 86.

To operate the clipping system of the present invention, the clipping unit or clipping machine 12 is mounted on a boom structure 10 that is supported between two opposed rails 28 in a greenhouse or in some other type of plant growing area. First, the clipping machine 10 is fixed on the boom structure and its height is adjusted such that the cutting unit 34 is spaced such that an appropriate top portion of the underlying plants is clipped. Typically, approximately one-half of the leaf area overlying the buds will be clipped. To adjust the height of the clipping unit 34, crank 78 is rotated either clockwise or counterclockwise. It is appreciated that the rotation of crank 78 results in the support box 68 being moved upwardly or downwardly along the inclined portions 60a of side members 60. This effectively adjusts the height of clipping unit 34 with respect to the boom structure 10.

Once the height of clipping unit 34 has been appropriately adjusted, the boom 10 is moved over the underlying plants. During this process the clipping unit is being powered and consequently a swath of clippings is cut, the swath being of a width generally equal to the width of the clipping unit 34. In a case where the boom is mounted within a greenhouse, it is appreciated that the boom is powered from one end of the greenhouse to the other end. Once a swath has been cut and the boom has reached one end of the greenhouse, it is then time to shift the clipping machine 12 and cut an adjacent swath. This is accomplished by releasing the latching mechanisms shown in FIG. 8, and shifting the clipping unit or machine over one width distance and then re-engaging the latching mechanism which essentially fixes the carriage 30 with respect to the boom structure 10.

Before proceeding with the next swath, the clipping unit is reversed, or turned 180° because it is preferably for the type of clipping unit 34 disclosed herein that the same be oriented in a forward direction during the clipping process. To reverse the clipping unit 34, the lock pin 76 is removed from the opening 74 within the support box 68 and the lower frame assembly rotated 180°. Thereafter the lock pin 76 is reinserted through an appropriate opening 58a or 58b in the mounting plate 58 and on into the opening 74 in the support box 68. Thereafter the clipping process is continued by driving the boom structure 10 toward the other end of the greenhouse. This process is continued until the clipping machine 12 has been incrementally advanced across the entire greenhouse or plant growing area.

It is appreciated that there may be side posts or other posts throughout the greenhouse and it may be difficult to cut or clip in the areas between such posts or other obstructions. In the case of the present invention, the entire clipping unit 34 can be offset so as to be able to get to these areas. As discussed beforehand, the support box 68 is supported by a lide sleeves 70 that are slidable on cross members 64 and 66. This enables the entire clipping unit to be pushed to one side such that the clipping unit can be effectively offset with respect to the carriage.

From the foregoing specification and discussion, it is appreciated that the present invention presents a very efficient and effective plant clipping system that utilizes an overhead clipping process. With the present invention one man can clip a greenhouse 35 feet 300 feet in two hours. This obviously obviates a substantial labor requirement and especially advantageous in view of the fact that it may be beneficial to carry out a plant clipping operation once a week during certain growning periods.

It is also appreciated that the present invention is relatively simple in construction, reliable and easy to use.

The present invention, may of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of clipping plants within a greenhouse or plant growing area comprising:
    (a) providing an overhead boom structure over underlying plants;
    (b) suspending a plant clipping machine from the boom structure;
    (c) adjusting the height of the plant clipping machine with respect to the overhead boom structure such that the clipping machine will cut a selected top portion of the plant as the cutting machine is moved thereover;
    (d) moving the boom structure over the underlying plants; and
    (e) clipping a top portion of the underlying plants as the boom structure and plant clipping machine are moved over the underlying plants.

2. The method of claim 1 including the steps of stationing the clipping machine on the boom structure in a first position and moving the boom structure in a first direction to cut a first swath of clippings from the underlying plants; shifting the clipping machine laterally on the boom structure from the first position to a second position and stationing the clipping machine in the second position; and reversing the boom and moving the same in a second direction so as to cut a second swath of plant clippings that is laterally spaced from the first swath.

3. The method of claim 2 including mounting the clipping machine to a carriage and moving the clipping machine laterally with respect to the carriage in order to cut between posts and other types of obstructions normally found along sides of the greenhouse.

4. The method of claim 3 including the step of rotating the clipping machine with respect to the carriage such that the heading of the clipping machine can be varied without having to rotate the carriage.

5. The method of claim 1 including the step of vacuuming the cut clippings as the clipping machine passes over the underlying plants.

6. The method of claim 1 wherein the step of adjusting the height of the clipping machine includes first adjusting the height thereof through a main height adjustment and then secondly adjusting the height through a fine height adjustment.

7. The method of claim 1 further including the step of movably mounting the overhead boom structure over an underlying plant growing area within a greenhouse, and moving the overhead boom structure back and forth within the coffins of the greenhouse so as to clip the top portion of plants disposed in the plant growing area.

8. The method of claim 7 including the step of supporting the overhead boom structure within the greenhouse on two laterally spaced rails that run through the greenhouse; and movably mounting the overhead boom structure such that it may move back and forth on the laterally spaced rails.

9. The method of claim 8 including mounting at least one guide roller to each end of the overhead boom structure and extending each guide roller to engage an adjacent rails such that the guide rollers cooperate to maintain the overhead boom structure aligned with the rails as the overhead boom structure moves back and forth on the rails.

10. A system for clipping the top portions of plants comprising:
(a) an overhead boom type structure adapted to move over the underlying plants;
(b) a plant clipping device secured to the boom type structure and depending downwardly therefrom, the plant clipping device including cutting means for clipping a top portion of the underlying plants as the plant clipping device is passed over the plant;
(c) means for laterally shifting the plant clipping device from one location on the boom structure to another such that a relatively large area of plants can be clipped by incrementally shifting the plant clipping device on the boom structure and moving the boom structure over the plants; and
(d) means for adjusting the height of the cutting means of the plant clipping device with respect to the boom structure.

11. The plant clipping system of claim 10 wherein the height adjustment means includes both a major and fine adjustment mechanism.

12. The system for clipping the top portion of plants of claim 10 including means for reversing the heading direction of the clipping device such that the same can be reversed prior to the boom structure reversing its direction.

13. The system for clipping the top poriton of plants of claim 10 wherein there is provided vacuuming means for collecting clippings from the plants during the plant clipping operation.

14. The plant clipping system of claim 10 wherein the plant clipping device comprises a carriage movably mounted on the boom type structure; a carrier frame secured to the carriage and depending therefrom; and a powered clipping unit secured to and carried by the carrier frame.

15. The plant clipping system of claim 4 wherein the carrier frame includes an upper subframe assembly that is secured to the carriage, and a lower subframe assembly connected to the upper subframe assembly and wherein the powered clipping unit is connected to the lower subframe assembly.

16. The plant clipping device of claim 15 wherein there is provided a turntable mechanism interposed between the subframe assembly and the lower subframe assembly of the carrier frame that enables the direction of the powered clipping unit to be reversed.

17. A method of cultivating transplants within a greenhouse comprising the step of:
(a) movably mounting an overhead boom structure within the greenhouse and over a plant growing area that includes transplants;
(b) suspending a plant clipping machine from the boom structure;
(c) adjusting the height of the plant clipping machine with respect to the underlying transplants such that the clipping machine will cut a selected top portion of the plant as the cutting machine is moved thereover;
(d) moving the boom structure back and forth through the greenhouse and selectively shifting the cutting machine along the boom structure at selected times such that multiple swaths may be cut as the boom structure is moved repeatedly back and forth through the greenhouse; and
(e) clipping the top portion of underlying transplants within the greenhouse as the boom structure and plant clipping machine are moved back and forth through the greenhouse.

18. The method of claim 17 including mounting the clipping machine to a carriage and moving the clipping machine laterally with respect to the carriage in order to cut between posts and other types of obstructions normally found along sides of the greenhouse.

19. The method of claim 17 including the step of vacumming the clipped top portions of the transplant as the plant clipping machine is moved over the transplants.

20. The method of claim 17 wherein the step of adjusting the height of the plant clipping machine includes the step of adjusting the height of the plant clipping machine with respect to the overhead boom structure.

21. The method of claim 17 including the step of supporting the overhead boom structure within the greenhouse on two laterally spaced rails that run through the greenhouse; and movably mounting the overhead boom structure such that it may move back and forth on the laterally spaced rails.

22. The method of claim 21 including mounting at least one guide roller to each end of the overhead boom structure and extending each guide roller to engage an adjacent rail such that the guide rollers cooperate to maintain the overhead boom structure aligned with the rails as the overhead boom structure moves back and forth on the rails.

23. The method of claim 17 including the step of rotating the clipping machine with respect to the carriage such that the heading of the clipping machine can be varied without having to rotate the carriage.

24. A plant clipping system for clipping plants within a plant growing area comprising:
(a) an overhead boom structure adapted to move over the underlying plants within the growing area;
(b) support means for movably mounting the boom structure such that it may move back and forth over the underlying plants;
(c) carriage guide means associated with the overhead boom structure;

(d) a carriage movably mounted on the carriage guide means for moving laterally back and forth along the overhead boom structure;

(e) a carrier frame secured to the carriage and depending downwardly therefrom;

(f) a plant clipping device secured to the carrier frame structure;

(g) means for adjusting the height of the plant clipping device with respect to underlying plants within the plant growing area such that a selected top portion of the plants may be clipped as the boom structure and plant clipping device are moved over the underlying plants; and (h) wherein the boom structure may be moved back and forth over the underlying plants while the carriage and plant clippig device may be shifted laterally along the boom structure such that a plurality of laterally spaced swaths may be cut be selectively shifting the carriage and plant clipping device laterally on the boom structure during the plant clipping operation.

25. The plant clipping system of claim 24 wherein there is provided means for receiving and retaining plant clippings as the boom structure and plant clipping device are passed over the underlying plants.

26. The plant clipping system of claim 25 wherein the means for receiving the plant clippings includes vacuuming means associated with the plant clipping device for receiving and storing plant clippings during the plant clipping operation.

27. The plant clipping system of claim 24 wherein there is provided means for rotating the plant clipping device such that the heading of the plant clipping device can be reversed with respect to the boom structure.

28. The plant clipping system of claim 27 wherein the carrier frame includes upper and lower sub-frame assemblies that are interconnected and wherein the plant clipping device is connected to the lower frame assembly; and where the means for rotating the plant clipping device with respect to the boom structure includes a turntable mechanism interposed between the upper and lower sub-frame assemblies; and wherein the means for adjusting the height of the plant clipping device with respect to the underlying plants includes means for moving the lower sub-frame assembly upwardly and downwardly with respect to the turntable mechanism.

29. The plant clipping system of claim 28 wherein the lower sub-frame assembly includes a sliding frame assembly movably mounted on an incline forming a part of the lower sub-frame assembly and wherein the sliding frame assembly supports the turntable mechanism, and wherein there is provided means for moving the sliding frame assembly upwardly and downwardly along the incline formed in the lower sub-frame assembly which effectively moves the lower sub-frame assembly upwardly and downwardly with respect to the overhead boom structure.

30. The plant clipping system of claim 24 wherein the carrier frame comprises an open frame structure extending downwardly from the carriage and which functions to support the plant clipping device below the carriage and boom structure.

31. The plant clipping system of claim 30 wherein the open frame structure of the carrier frame extends downwardly along opposite sides of the boom structure.

32. The plant clipping system of claim 31 wherein the open frame structure of the carier frame includes a plurality of individual frame members operatively connected to the carriage and which effectively extend downwardly from the carriage and encircles a substantial portion of the boom structure such that as the carriage and plant clipping device are moved laterally back and forth on the boom structure the open frame structure of the carrier frame lies totally outside of the boom structure and generally encircles a portion thereof.

33. The plant clipping system of claim 30 wherein the carrier frame includes an upper sub-frame assembly that is secured to the carriage, and a lower sub-frame assembly connected to the upper sub-frame assembly and wherein the plant clipping device is connected to the lower sub-frame assembly.

34. The plant clipping system of claim 33 wherein there is provided a turntable mechanism interposed between the upper sub-frame assembly and the lower sub-frame assembly of the carrier frame that enables the direction of the clipping device to be reversed.

35. The plant clipping system of claim 33 further including means for laterally shifting the lower sub-frame assembly back and forth with respect to the upper sub-frame assembly so as to facilitate the cutting of plants disposed between longitudinally spaced obstacles within the plant growing area.

36. The plant clipping system of claim 33 wherein the means for adjusting the height of the plant clipping device with respect to the underlying plants includes means for adjusting the height of the lower sub-frame assembly with respect to the upper sub-frame assembly.

37. The plant clipping system of claim 24 including means to sttion the carriage at selected locations along the boom structure such that the carriage and underlying plant clipping device may be supported at one position on the boom structure as the plant clipping system is cutting a particular swath through the plant growing area.

* * * * *